Patented Sept. 28, 1948

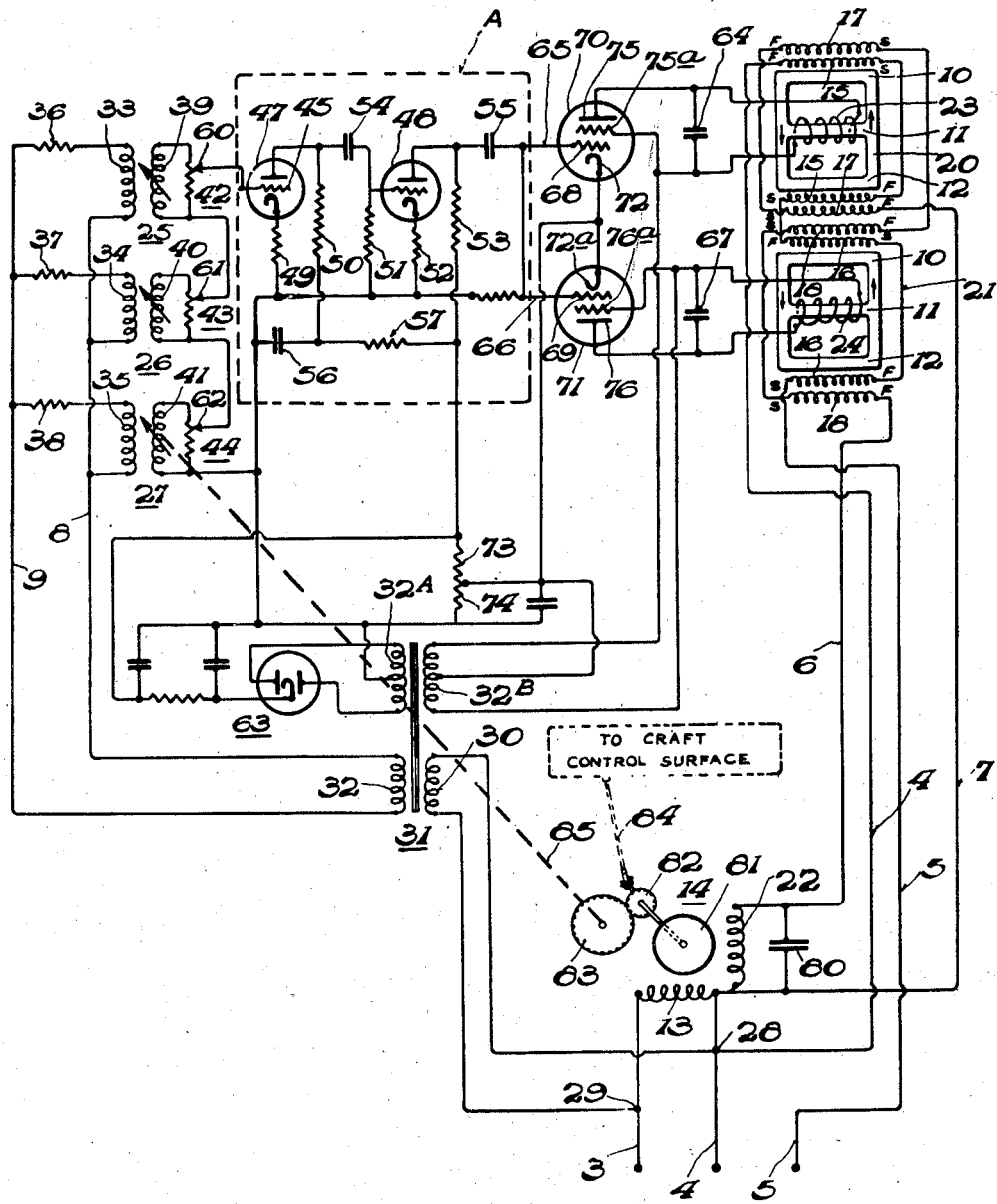

2,450,084

UNITED STATES PATENT OFFICE 2,450,084

ELECTRIC MOTOR SERVO CONTROL SYSTEM

John F. Emerson, Hasbrouck Heights, N. J., assignor to Bendix Aviation Corporation, Teterboro, N. J., a corporation of Delaware Application December 31, 1943, Serial No. 516,445

3 Claims. (Cl. 318—28)

The present invention relates to servo control systems and particularly to a concentrated electrical system for automatic control of aircraft.

Heretofore, electrical control systems for automatic control of aircraft, wherein a plurality of self-synchronous repeaters are used for converting mechanical displacements into electrical voltages, have been very heavy due to the use of transformers in the amplifier and a still additional driver transformer to the discriminator unit. Such electrical systems, while having greater advantages than fluid systems, nevertheless are heavier and of greater bulk than the fluid control systems. Accordingly, one object of the present novel automatic electrical control system is to provide for maintaining all the inherent advantages of an electrical system over the fluid, while also providing for a materially simplified, lighter, smaller and more readily installed electrical system for aircraft use than in such prior arrangements.

A further object of the present invention is to provide in combination a series of electrical control devices arranged to automatically transmit amplified voltage signals repeated from a plurality of sources as a factor derived from the algebraic sum of such signals.

Another object is to provide in a craft servo control system, a novel proportioning and mixing circuit adapted to automatically determine the algebraic sum of a plurality of craft control telemetric indicating systems for proportional conversion thereof into mechanical movements.

Another object is to provide in an aircraft automatic pilot system, a novel servo control system of materially condensed proportions, whereby size and weight of the entire system are substantially reduced by substitution of relatively simple, small and light electrical devices, such as resistors and condensers for heavy and bulky devices, such as transformers.

Yet another object is to provide in a servo control system for aircraft, an electrical system comprising the novel combination of a resistance coupled amplifier responsive to the algebraic sum of signal voltages introduced into the amplifier by a mixing and proportioning circuit representative of a desired control setting of an automatic pilot system, and a discriminator arrangement, whereby such voltage signals control the craft according to the direction of variation of any craft control telemetrically coupled thereto, so as to provide driving torque to a polyphase motor in either direction necessary to compensate for such variation.

The above and other objects and advantages of the present invention will appear more fully hereinafter from a consideration of the detailed description which follows, taken together with the accompanying drawing wherein one embodiment of the invention is illustrated. It is to be expressly understood, however, that the drawing is for the purpose of illustration only and is not designed as a definition of the limits of the invention. Reference for this latter purpose should be had to the appended claims.

In the schematic diagram shown in the drawing, the reference characters refer to like parts throughout the specification.

Referring in detail to the schematic diagram of the drawing, there is provided a three-phase source of A. C. power represented by leads 3, 4 and 5 having the leads 3 and 4 thereof connected to coil 13, so as to provide for energization of the fixed phase of a two-phase motor 14.

Leads 4 and 5 of the source are connected to primary windings 15—15 and 16—16 so as to connect them in series, as shown by the letters S—F, which represent start and finish of the primary windings. Across from primary winding 15—15 is secondary winding 17—17 and across from primary winding 16—16 is secondary winding 18—18.

The primary and secondary windings 15—15, 16—16, 17—17, and 18—18, respectively, may be each mounted on a core frame, having three parallel legs 10, 11 and 12, the outer two for the primary and secondary coils and the central leg 11 of each core for mounting a saturating winding, such as 23 and 24, respectively, either of which when supplied with direct current decrease permeability of the transformer core.

The secondary windings 17—17 and 18—18 are connected in series opposed relation and through leads 6 and 7 to opposite ends of a polyphase motor winding 22. Winding 17—17 is connected to the motor winding 22 by the lead 7 and winding 18—18 is connected thereto by the lead 6, so as to normally balance against each other. The directions of the windings are illustrated by letters S—F, representative of start and finish of the windings. Thus the windings 15—15, 17—17 and 23, together with windings 16—16, 18—18 and 24, provide a pair of separate saturable normally balanced transformer networks, either of which is unbalanced according to the phase or polarity of the mixed resultant voltage signals introduced by variable inductive coupling devices 25, 26 and 27 into an amplifier network generally denoted as A, presently to be described.

Leads 3 and 4 are further tapped at points 28 and 29 to primary winding 30 of a power transformer 31, the secondary coil 32 of which is connected to stator coils 33, 34 and 35 of said inductive devices 25, 26 and 27 on one side by lead 8 and through lead 9 and resistors 36, 37 and 38 in series with the other side of the stator coils 33, 34 and 35. Inductively coupled with the respective stator coils are rotors 39, 40 and 41, which in their turn are connected in series to the two-stage resistance coupled amplifier network A from potentiometers 42, 43 and 44 connecting with control grid 45 of said amplifier network. The inductive devices 25, 26 and 27 are such that the voltage induced into rotors 39, 40 and 41 will vary with the position of each rotor with respect to its stator.

The signal voltage at grid 45 will be the vectoral sum of the voltages introduced by potentiometers 42, 43 and 44. For proper operation, these voltages must be in phase, either zero degrees or 180 degrees in order that they will add algebraically. This is provided by adjusting resistors 36, 37 and 38, together with the proper total or series resistance of potentiometers 42, 43 and 44. For example, increasing the resistance of potentiometer 42, produces phase shift in the opposite direction from increase in resistor 36. The desired ratio of signals is obtained by adjusting the taps 60, 61 and 62 of potentiometers 42, 43 and 44.

The resistance coupled amplifier comprises a pair of electron tubes 47 and 48 connected in cascade which are responsive to the algebraic sum of the resultant signal voltages introduced by the inductive devices 25, 26 and 27 and proportionally mixed by said potentiometers 42, 43 and 44, to thereby provide the amplification required before applying the signal to tubes 70 and 71 of a discriminator unit, hereinafter described. The amplifier electron tubes 47 and 48 are associated in the usual amplifier network with resistors 49, 50, 51, 52 and 53 and condensers 54 and 55 with a resistance capacity filter 56 and 57.

The usual plate voltage for amplifier tubes 47 and 48 is supplied through suitable means, such as rectifier network 63 which receives current from a power transformer coil 32A.

The amplifier A is connected on its output side by leads 65 and 66 to grids 68 and 69 arranged in parallel paths to each other in grid controlled half wave rectifier tubes 70 and 71 through condenser 55, and are so arranged that the voltage from the amplifier has approximately zero degrees or 180 degrees phase relation with respect to one or the other of the cathode to plate voltages of the tubes 70 and 71.

The arrangement of the circuit of tubes 70 and 71 and selection of the proper type tube has made it possible to reduce the weight, size and power consumption of the system. For example, the selection of tubes 70 and 71 is largely determined by the plate current that will flow for zero grid to cathode volts at peak plate voltage, each tube 70 and 71 providing half wave rectification, so as to introduce direct current in transformer windings 23 and 24. Condensers 64 and 67 are input filter condensers such as usually used with half wave rectifiers having inductive loads which are supplied by saturating transformer coils 23 and 24.

Tubes 70 and 71 receive plate voltage as hereinbefore mentioned, at power supply frequency from center tapped winding 32B of power transformer 31, through windings 23 and 24, respectively, paralleled with input filter condensers 64 and 67. Since windings 23 and 24 are connected to opposite ends of winding 32B the voltages are of opposite polarity, that is phased 180 degrees with respect to each other.

The internal current of tubes 70 and 71 does not flow through the bias resistors 73 and 74, so these resistors can be high in value and require low current. For these reasons a simple resistance-capacity filter is satisfactory for filtering the output of the network of rectifier 63. The cathodes 72 and 72A are thus made positive with respect to their respective grids 68 and 69, for zero signal, by voltage divider resistors 73 and 74.

This bias voltage of tubes 70 and 71 is sufficient to permit only small amounts of plate current to flow during the maximum positive values of plate voltage, the average currents, for example, being limited to about .002 ampere for zero signal. This is desirable, since the saturable transformers 20 and 21 will then draw the minimum magnetizing current consistent with good sensitivity for small signals.

*Operation*

Referring to the operation, when no variation is produced in the several variable inductive coupling devices 25, 26 and 27, the signals at both grids 68 and 69 of tubes 70 and 71 are zero so that transformers 20 and 21 are balanced and the current output through leads 6 and 7 from primaries 15—15 and 16—16 is zero because the the secondaries 17—17 and 18—18 are in series opposed relation so that the induced voltage in one secondary balances the induced voltage in the other secondary.

Now assuming that a voltage signal is present at the grids 68 and 69, so that they are going through their negative or positive half cycles; such signal voltage will be phased at zero degrees with respect to one plate and screen grid voltage and 180 degrees with respect to the other plate and screen grid voltage, depending upon the angular direction of the variable inductive coupling device or devices introducing the same. Thus, during the positive half cycle of the variable voltage signal applied to control grids 68 and 69 of tubes 70 and 71, the index voltage of plate 75 and associated screen grid 75a of tube 70 might also be going through a positive half cycle and plate 76 and associated screen grid 76a of tube 71 would then be going through a negative half cycle. Now during the time that index voltage at plate 75 of tube 70 goes through its negative half cycle, the voltage to plate 76 of tube 71 will be passing through a positive half cycle but the control grids 68 and 69 will then be going through their negative half cycle, thereby preventing the flow of current in tube 71, because the plate and screen grid voltage of this tube are phased at 180 degrees from those of tube 70.

The foregoing operation, results in an unbalance between transformers 20 and 21, by producing a direct current in saturating winding 23, that is not balanced by an equal current in winding 24. As a result of such current flow, the core of transformer 20 decreases in permeability so that voltage induced in secondary winding 17—17 will be decreased in value causing an unbalance in the network of the transformers 20 and 21, resulting in a current flow at output leads 6 and 7 of one phase to winding 22 of the two-phase motor 14. The amount of this unbalance will depend upon the signal amplitude until maximum saturating current flows or the core is completely saturated.

The reverse of this operation occurs upon angular movement of the variable inductive coupling devices 25, 26 and 27 in the opposite direction thereby reversing the phase of the signal, whereupon the tube 70 will conduct no current and tube 71 will conduct current in the same manner as described above in connection with tube 70.

It obviously follows that the direction of motor torque is reversed when the phase of the amplifier applied voltage is reversed since secondary 18—18 is in opposition to secondary 17—17. This is accomplished by reversing the phase of the signal voltage from variable inductive coupling devices 25, 26 and 27 thus causing greater direct current in winding 24 compared to winding 23 to unbalance transformers 20 and 21.

A condenser 80 parallel with winding 22 of motor 14 may be used for power factor correction and should tune winding 22 for unity power factor at the operating frequency.

Rotor 81 of motor 14 when rotated in either direction by a signal voltage introduced in winding 22 is connected through a transmission system, such as represented broadly by gears 82 and 83 and a shaft 84 to one of any objects being controlled, such as a rudder or the like, not shown, and a shaft 85, which is suitably connected to the rotor 41 of the variable inductive coupling device 27.

Shaft 84 angularly positions an object or control in accordance with the direction of motor torque and shaft 85 is arranged to return the rotor 41 of the inductive device 27 to null position in synchronism with the new position of the controlled object and in synchronism with the motor rotor 81, which deenergizes after having driven said object or control to its new position.

There is thus provided a novel electrical servo system for automatic control of mobile objects, such as marine craft, aircraft and the like, which is materially compact and reduced in weight by the elimination of substantially all heavy and bulky apparatus heretofore considered essential to produce sufficient power to operate the craft controls.

Also, the present novel electrical system has been provided so that a plurality of signal variable inductive coupling devices actuated by condition responsive indicators of the axial position and course of a craft are arranged, so that the algebraic sum of the controlling signals are automatically proportioned in a single circuit arrangement and then amplified through a simplified tube circuit for either positive or negative operation of the controls of the craft on which the system has been installed.

Although the present invention is only described and illustrated in detail for one embodiment thereof, it is to be expressly understood that the same is not limited thereto. Various changes may be made in design and arrangement of the embodiment illustrated, as will now be apparent to those skilled in the art. For a definition of the limits of the invention, reference should be had to the appended claims.

What is claimed is:

1. The combination with at least two variable inductive devices adapted for developing separate signals of changing phase and amplitude and a reversible motor energized in accordance with the algebraic sum of said signals together with a controlled member driven by said motor, of amplifying means connected to said devices and responsive to said signals as well as to the phase thereof for determining the energization and the direction of rotation of said motor, said means comprising a pair of electronic members, one or the other of which becomes conductive depending upon the phase of said signals, a pair of magnetically permeable core members, each core member being formed with a central leg and a pair of spaced parallel outer legs, A. C. supply windings on the outer legs of both of said core members connected with each other in series aiding relation, A. C. output windings on the outer legs of both of said core members and connected in series opposed relation whereby normally the system is balanced and no current is induced to flow in said output windings in response to A. C. current flow in said supply windings, a saturating winding on the central leg of each of said core members whereby in response to current flow in one or the other of said saturating windings the system is unbalanced to provide an A. C. current at said output windings, means connecting said saturating windings to said electronic members, and means connecting said output windings to said motor.

2. The combination with at least two variable inductive devices adapted for developing separate signals of changing phase and amplitude and a two phase induction motor energized in accordance with the algebraic sum of said signals together with a controlled member driven by said motor, of amplifying means connected to said devices and responsive to said signals as well as to the phase thereof for determining the energization and the direction of rotation of said motor, said means comprising a pair of electronic members, one or the other of which becomes conductive depending upon the phase of said signals, a pair of magnetically permeable core members, each core member being formed with a central leg and a pair of spaced parallel outer legs, A. C. supply windings on the outer legs of both of said core members connected with each other in series aiding relation, A. C. output windings on the outer legs of both of said core members and connected in series opposed relation whereby normally the system is balanced and no current is induced to flow in said output windings in response to A. C. current flow in said supply windings, a saturating winding on the central leg of each of said core members whereby in response to current flow in one or the other of said saturating windings the system is unbalanced to provide an A. C. current at said output windings, an A. C. current source connected to said supply windings and to one phase of said motor, means connecting said saturating windings to said electronic members, and means connecting said output windings to the second phase of said motor.

3. The combination with at least two variable inductive devices adapted for developing separate signals of changing phase and amplitude and a two phase induction motor energized in accordance with the algebraic sum of said signals together with a controlled member driven by said motor, of amplifying means connected to said devices and responsive to said signals as well as to the phase thereof for determining the energization and the direction of rotation of said motor, said means comprising a pair of electronic tubes, one or the other of which becomes conductive depending upon the phase of said signals, saturable transformer means having a pair of magnetically permeable core members, each core member being formed with a central leg and a pair of spaced parallel outer legs, A. C. supply windings on the outer legs of both of said core members connected with each other in series aiding relation, A. C. output windings on the outer legs of both of said core members and connected in series opposed relation whereby normally the system is balanced and no current is induced to flow in said output windings in response to A. C. current flow in said supply windings, a saturating winding on the central leg of each of said core members whereby in response to current flow in one or the other of said saturating windings the system is unbalanced to provide an A. C. current at said output windings, an A. C. current source connected to said supply windings and to one phase of said motor, means connecting said saturating windings to said tubes, means connecting said output windings to the second phase of said motor, and a drivable connection between said motor and one of said inductive devices.

JOHN F. EMERSON.

REFERENCES CITED

The following references are of record in the file of this patent:

UNITED STATES PATENTS

| Number | Name | Date |
|---|---|---|
| 2,134,901 | Wey | Nov. 1, 1938 |
| 2,164,728 | Wey | July 4, 1939 |
| 2,373,241 | Field | Apr. 10, 1945 |

FOREIGN PATENTS

| Number | Country | Date |
|---|---|---|
| 489,271 | Great Britain | July 22, 1938 |